H. M. MYERS.
ANTISKID DEVICE FOR WHEEL TIRES.
APPLICATION FILED APR. 7, 1920.
1,370,758.
Patented Mar. 8, 1921.
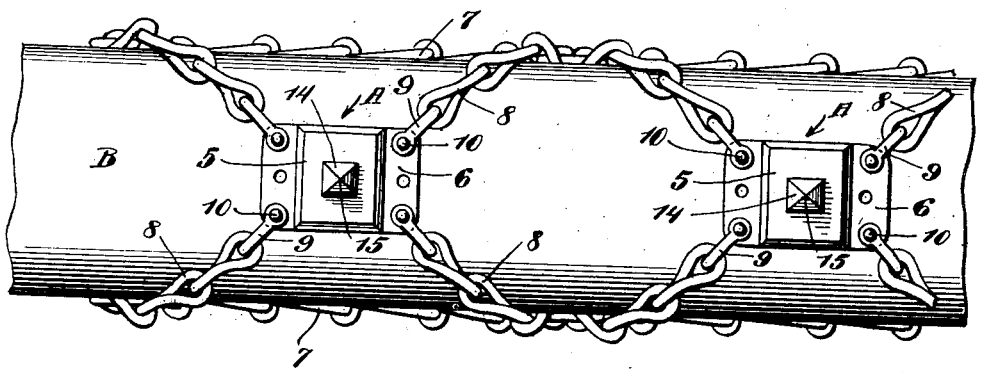
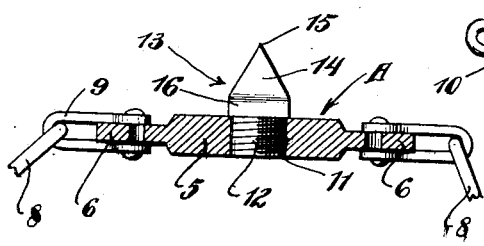
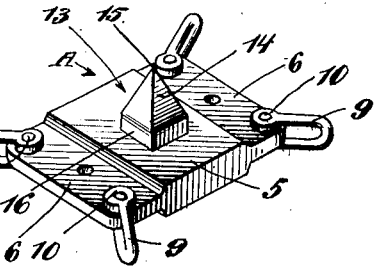
Inventor
Henry M. Myers
By Geo. P. Kimmel
Attorney

UNITED STATES PATENT OFFICE.

HENRY M. MYERS, OF STATE COLLEGE, PENNSYLVANIA.

ANTISKID DEVICE FOR WHEEL-TIRES.

1,370,758.	Specification of Letters Patent.	Patented Mar. 8, 1921.

Application filed April 7, 1920. Serial No. 372,029.

*To all whom it may concern:*

Be it known that I, HENRY M. MYERS, a citizen of the United States, residing at State College, in the county of Center and State of Pennsylvania, have invented certain new and useful Improvements in Antiskid Devices for Wheel-Tires, of which the following is a specification.

The invention relates to an anti-skid device and more particularly to the class of anti-skid chain constructions for use upon wheel tires of automobiles and other vehicles.

The primary object of the invention is the provision of a device of this character, wherein the same when applied to a tire of the wheel of an automobile or other vehicle, will assure positive traction and prevent skidding upon slippery surfaces, the device in its construction embodying tread plates each having a removable calk so that when the latter becomes worn or damaged for further use a new calk can be substituted.

Another object of the invention is the provision of a device of this character, wherein each tread plate is connected in the chain so that said plate will be sustained in proper position relative to the tread of the tire and will be flexibly supported for movement to avoid any interference with the yielding of the tire when in use.

A further object of the invention is the provision of a device of this character, wherein maximum wear is afforded and thereby increasing the life of the same.

A still further object of the invention is the provision of a device of this character, wherein each tread plate carrying the removable calk is of special construction to withstand severe usage and strains and stresses when the anti-skid is applied to the tire of a wheel.

A still further object of the invention is the provision of an anti-skid device of this character which is extremely simple in construction, thoroughly reliable and efficient in its purpose, strong, durable and inexpensive to manufacture.

With the foregoing objects in view, the invention presents a novel construction, combination and arrangement of parts as described herein and claimed and as illustrated in the accompanying drawing, wherein—

Figure 1 is a fragmentary plan view showing the anti-skid device constructed in accordance with the invention applied to the tire of a wheel.

Fig. 2 is a vertical longitudinal sectional view through one of the tread plates.

Fig. 3 is a perspective view of one of the tread plates detached from the chain and showing the pivoted links assembled therewith.

Similar reference characters indicate corresponding parts throughout the several views in the drawing.

Referring to the drawing in detail:

The anti-skid device comprises a series or a plurality of tread plates A, each formed with a thickened transverse intermediate portion 5 and outer opposite relatively thin portions 6, the plate being of substantially rectangular shape and having rounded corners. The plate A is preferably made from metal forged or otherwise formed and in the outer relatively thin portions 6 thereof near the corners of said plate are suitable openings for the pivotal connection thereof with a carrying chain hereinafter fully described.

The carrying chain comprises side chains 7 which are adapted to be disposed at and extend around the opposite sides of the tire B, and the ends of these chains are detachably connected together in any suitable manner. Connected with the side chains 7, at spaced intervals thereof, are short chains 8 which are also connected with substantially U-shaped links 9, carrying pivots 10 which are passed through the openings in the relatively thin portions 6 of each tread plate A, the short chains 8 being disposed to diverge from each tread plate A toward the side chains 7 and serve to hold the said tread plate A in position centrally upon the tread of tire B.

It is of course to be understood that the tread plate carrying chain can be of any construction for the connection of links 9 pivoted to the tread plates A therewith so that said tread plates A will be located centrally of the tire B to be supported by the tread thereof.

Each tread plate A in the intermediate transverse thickened portion 5 thereof centrally of the same is formed with a threaded hole 11, for the detachable engagement therein of the threaded shank 12, of a calk 13, the same being formed with opposite beveled sides 14 to provide a point 15, so that the calk 13 will firmly grip the surface to prevent skidding and to improve the traction of the tire on the wheel of the automobile or other vehicle in the use of the anti-skid device.

When the calks 13 become worn or damaged any one of the same can be readily removed for the substitution of a new calk therefor. The shank 12 of each calk is of a length corresponding to the length of the threaded hole 11 so that the inner end of the shank when engaged in the hole will be flush with the inner face of the intermediate portion 5 of the tread plate A and thereby avoid any damage to the tire B when the tread plate is resting upon its tread.

Each calk 13 inwardly beyond the beveled side faces 14 is formed with wrench engaging surfaces 16 so that a wrench or other like tool can be engaged with said calk to facilitate the mounting of the same in the tread plate A or its removal therefrom.

The outer thin portions 6 of the tread plate A provide a clearance for the pivoted ends of the links 9 connected with said tread plate A so that these links at the inner sides thereof will not be caused to cut into the tread of the tire B when the anti-skid device is applied to the tire and in use.

It will be apparent that each tread plate A is free for movement by reason of the links 9 connecting the same to the short chains 8, which links 9 are pivoted to said plates, so that should the chains become distorted the tread plates A will become self-adjusted accordingly and also will properly position themselves when the chains have been relieved from the strain or stresses causing the distortion thereof.

From the foregoing it is thought that the construction and manner of use of the anti-skid device will be clearly understood and therefore a more extended explanation has been omitted.

What is claimed is:

An anti-skid device of the class described, comprising a rectangular plate, said plate having a thickened, intermediate, squared tread portion and outer, opposite raised thin portions, pivotally connected links secured to the outer corners of said thin portions of the plate for flexible connection with a carrying chain, said thin portions of the plate providing a clerance for the pivoted links to prevent the same from cutting into the tread of the tire and a removable calk mounted in the thickened portion of said plate.

In testimony whereof, I affix my signature hereto.

HENRY M. MYERS.